United States Patent Office 3,767,716
Patented Oct. 23, 1973

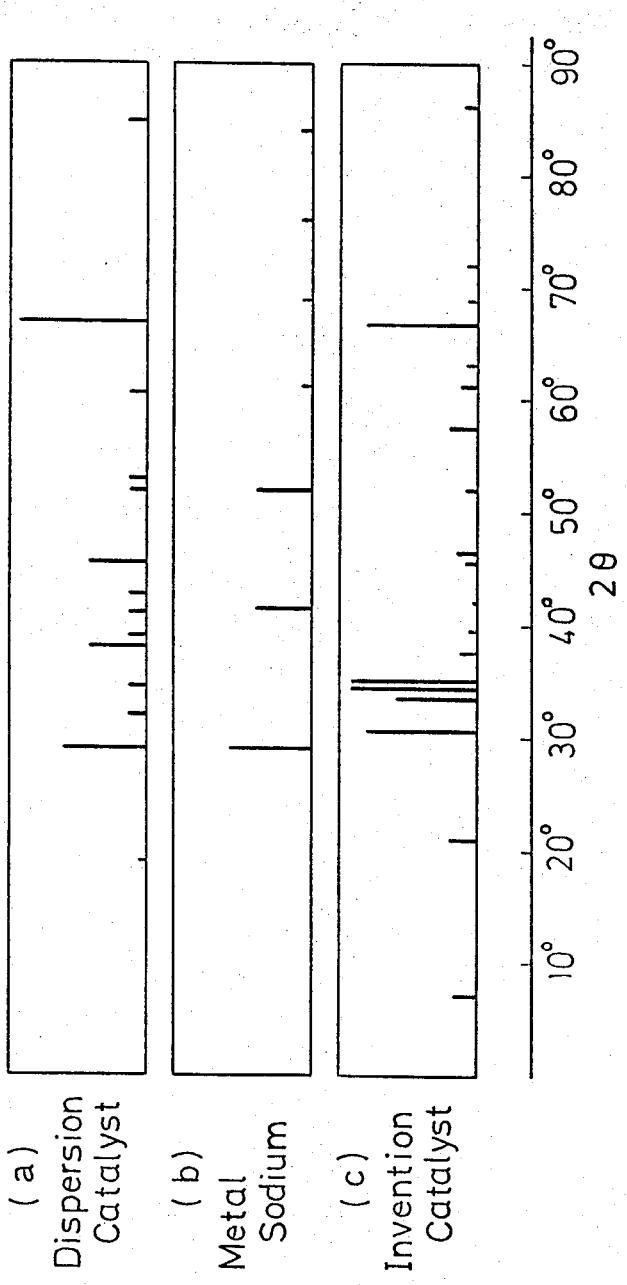

3,767,716
PROCESS FOR THE PRODUCTION OF
1,3-CYCLOOCTADIENE
Tsuneyuki Nagase, Gohu Suzukamo, and Masami Fukao, Takatsuki, Japan, assignors to Sumitomo Chemical Company Limited
Filed Sept. 27, 1971, Ser. No. 183,771
Claims priority, application Japan, Nov. 20, 1970, 45/103,015; June 23, 1971, 46/45,859
Int. Cl. C07c 5/24
U.S. Cl. 260—666 A
14 Claims

ABSTRACT OF THE DISCLOSURE

A process for production of 1,3-cyclooctadiene which comprises contacting 1,5-cyclooctadiene with a catalyst obtained by heating an alkali metal, an alkali metal hydroxide and alumina at a temperature higher than the melting point of the alkali metal. By such process, 1,3-cyclooctadiene in cis-cis form can be produced predominantly in an excellent yield.

The present invention relates to a process for production of 1,3-cyclooctadiene. More particularly, it relates to a process for production of 1,3-cyclooctadiene by isomerization of 1,5-cyclooctadiene using a specific catalyst.

Hitherto, 1,3-cyclooctadiene has been produced by Hofmann degradation of or direct elimination of hydrogen halide from halogenocyclooctene (J. Am. Chem. Soc., 72, 1128 (1950)). This process is industrially disadvantageous in the starting material and the production steps.

It has now been found that 1,5-cyclooctadiene is readily isomerized to 1,3-cyclooctadiene in a quantitative yield by the use of a specific, novel catalyst. Since 1,5-cyclooctadiene can be obtained by cyclic dimerization of butadiene with ease, the said finding is quite valuable from the viewpoint of the industrial production of 1,3-cyclooctadiene.

The said catalyst useful in the isomerization of 1,5-cyclooctadiene to 1,3-cyclooctadiene can be prepared by heating an alkkali metal, and alkali metal hydroxide and alumina at a temperature higher that the melting point of the alkali metal.

As the alkali metal, there may be used one or more of lithium, sodium, potassium, rubidium and other metals in Group I of the Periodic Table. These metals may be used in the form of an alloy consisting of two or more kinds of alkali metals. A typical example of such an alloy is sodium-potassium alloy. Examples of the alkali metal hydroxide are hydroxides of lithium, sodium, potassium, rubidium and other metals in Group I of the Periodic Table. One or more kinds of the alkali metal hydroxides can be used. The alkali metal hydroxide is not necessarily required to correspond to the said alkali metal. Thus, the combination of the alkali metal and the alkali metal hydroxide, sodium and sodium hydroxide, potassium and potassium hydroxide or rubidium and rubidium hydroxide as well as lithium and sodium hydroxide, sodium and potassium hydroxide or lithium and potassium hydroxide.

The alumina may be, for instance, α-alumina, κ-alumina, θ-alumina, δ-alumina, γ-alumina, η-alumina, χ-alumina or ρ-alumina. There may be also used such an alumina-containing material as kaolin or alumina silicate for the source of alumina. Usually, however, the use of alumina itself is much favorable.

The amount of the alkali metal hydroxide to the alumina is not limitative but is normally preferred to be 1/100 to 100% by weight. The alkali metal may be employed in an aquimolar or less amount, preferably in an equimolar to 1/100 molar amount, with respect to the alkali metal hydroxide.

For preparation of the catalyst, the said materials, i.e. the alkali metal, the alkali metal hydroxide and the alumina, are heated at a temperature higher than the melting point of the alkali metal (preferably from 200 to 500° C.), ordinarily in an inert gas such as nitrogen, helium or argon while stirring. The reaction time is associated with the temperature of heating and may be usually from 1 to 30 hours. A higher temperature requires a shorter reaction time.

Practically, the alumina is first heated to a desired temperature and, while maintaining such temperature the alkali metal and the alkali metal hydroxide are added thereto. Although the order of incorporation of these materials is optional, the order of the alumina, the alkali metal hydroxide and the alkali metal is the most preferred. In this case, the alkali metal hydroxide can be used in the form of an aqueous solution, provided that the water in such solution is sufficiently removed, usually under reduced pressure, prior to the addition of the alkali metal.

In the above procedure, the preparation of the catalyst may be started with the use of the alkali metal and an alumina having water removable therefrom, i.e. without using the alkali metal hydroxide. The term "removable water" hereinabove used is intended to mean not only movable water itself but also structural water and hydroxy groups which can be eliminated in the form of water, inclusively. Thus, the alumina herein utilizable may be any alumina other than α-alumina which is considered to include no removable water. The water content in such utilizable alumina may be usually from 1.3 to 15% by weight, favorably from 2.3 to 10% by weight. The alkali metal is employed in an amount larger that that which can consume completely the water in the starting alumina, preferably 1.01 to 2 times the amount which can use up such water.

Actually, the reaction may be carried out by heating the alumina and a whole amount of the alkali metal together or by heating first the alumina with a portion of the alkali metal so as to consume substantially the water in the the alumina and, after the addition of the remaining portion of the alkali metal, continuing the heating. In the latter case, the alkali metal which is initially used may be the same as or different from the one employed later. The reaction temperature and the reaction time may be entirely the same as those mentioned in connection with the procedure using the alkali metal hydroxide.

The said alternative procedure may be understood to be substantially the same as the previous procedure and falling within the scope of this invention, because the reaction is assumed to proceed as follows: a portion of the alkali metal is first reacted with the water removed from the alumina to produce the corresponding alkali metal hydroxide and then the remaining portion of the alkali metal, the produced alkali metal hydroxide and the resultant alumina are reacted with each other.

Different from a conventional dispersion catalyst wherein an alkali metal is dispersed on a carrier material having a large surface area such as alumina, silica gel, activated carbon or sodium carbonate (J. Am. Chem. Soc., 82, 387 (1960)), the thus obtained catalyst does not contain the alkali metal. This is clearly in evidenced by the following facts:

(1) The catalyst of the invention is colored white to grey;ish white and does not show any pattern attributed to the alkali metal as a simple substance in the X-ray diffraction pattern (cf. Figure (c) of the attached drawings), whereas the dispersion catalyst is colored violet to black and shows a pattern attributed to the alkali metal as a simple substance in the X-ray diffraction pattern (cf. Figures (a) and (b) of the attached drawings). In this connection, it is notable that the active dispersion catalyst shows a color inherent to the alkali metal as a simple substance such as violet black in case of potassium or black in case of sodium and, when it turns to gray, the catalytic activity is lost (J. Chem. Soc., 1967, 2179).

(2) When treated with liquid ammonia, the catalyst of the invention does not afford any color, whereas the dispersion catalyst exhibits sensitively a dark violet color due to the alkali metal as a simple substance present therein.

Further, the catalyst of the invention may be differentiated from the dispersion catalyst in the essential use of the alumina for its preparation. That is, the use of any conventional carrier material other than and instead of the alumina in the preparation of the catalyst according to the present invention does not provide any composition having an appreciable catalytic activity, while the conventional dispersion catalyst prepared by the use of a conventional carrier material other than alumina such as activated carbon, silica gel or sodium carbonate shows the substantially same activity as the one prepared by the use of alumina.

It is particularly notable that the conventional dispersion catalyst is easily ignited on exposure to air or reacted readily with water to generate hydrogen whereby the catalytic activity is lost, while the catalyst of this invention is highly stable to air and water and maintains a strong catalytic activity with a long catalytic life. Thus, the catalyst of this invention can be handled without any special care in the atmosphere.

When the reaction of the alkali metal, the alkali metal hydroxide and the alumina according to this invention is carried out insufficiently and incompletely, the resulting composition may include unreacted alkali metal and exhibit some characteristics due to the same. The catalytic activity of such composition is inferior to that of the catalyst obtained by the complete proceeding of the reaction but still much higher than that of the conventional dispersion catalyst.

According to the present invention, 1,5-cyclooctadiene is contacted with the said catalyst to give 1,3-cyclooctadiene in a quantitative yield.

Although any specific limitation does not exist on the amount of the catalyst to be employed, its use in $\frac{1}{1000}$ to 100% by weight to the starting 1,5-cyclooctadiene is usual. Particularly preferred is $\frac{1}{100}$ to $\frac{1}{5}$ by weight of the catalyst to the starting 1,5-cyclooctadiene.

The isomerization may be effected batchwise or continuously. The starting 1,5-cyclooctadiene may be charged in a reaction vessel together with the catalyst from the initiation of the reaction or may be continuously or intermittently added to the reaction vessel depending on the proceeding of the reaction.

The isomerization is usually carried out with the starting 1,5-cyclooctadiene not to be preheated. The reaction is exothermic. However, the heat of reaction is small, and it is not necessary to cool the reaction system with a cooling device. Heating the reaction system is not required and, even if made, no unfavorable influence on the isomerization is seen. The upper limit of the heating temperature is the boiling point of 1,5-cyclooctadiene.

If desired, an appropriate inert solvent such as hydrocarbon (e.g. pentane, hexane, isopentane, dodecane) or ether (e.g. diethylether, tetrahydrofuran, dioxane) may be employed. For assuring the complete proceeding of the isomerization, the isomerization may be favorably effected in an inert gas.

The progress of the isomerization is usually examined by the gas chromatographic analysis or any other instrumental analysis. Since the reaction proceeds quantitatively, the product is of high purity without applying any purification procedure thereto. If desired, however, it may be purified by a per se conventional procedure such as distillation or chromatography.

For 1,3-cyclooctadiene, there are present two isomers, i.e. cis-cis isomer and cis-trans isomer. In the isomerization of this invention, cis-cis-1,3-cyclooctadiene is produced predominantly.

Practical and presently preferred embodiments of the present invention are illustratively shown in the following examples.

EXAMPLE A

In a 100 ml. four-necked flask, activated alumina (50 g.) was charged and stirred at 380 to 400° C. for 2 hours under nitrogen. Sodium hydroxide (8.7 g.) was portionwise added thereto at the same temperature, and the resultant mixture was stirred for 20 minutes. Then, metallic sodium (2.0 g.) was portionwise added thereto, whereby the mixture became black but turned gradually white. After being stirred for 2 hours, the reaction mixture was allowed to cool to give a catalyst product. The product was not ignited upon exposure to air, and generation of hydrogen was not seen on admixture with water.

EXAMPLE B

In a 100 four-necked flask, activated alumina (50 g.) was charged and stirred at 400 to 420° C. for 1.5 hours under nitrogen. Potassium hydroxide (12.2 g.) was portionwise added thereto at the same temperature, and the resultant mixture was stirred for 40 minutes. Then, fragments of metallic potassium (1.5 g.) were added thereto over 10 minutes, and stirring was continued for 2 hours at the same temperature. The reaction mixture was allowed to cool to give a catalyst product.

EXAMPLE C

In a 100 ml. four-necked flask, activated alumina (50 g.) was charged and stirred at 400 to 420° C. for 2 hours under nitrogen. Sodium hydroxide (8.7 g.) was portionwise added thereto at the same temperature, and the resultant mixture was stirred for 20 minutes. Then, metallic sodium (2.0 g.) was portionwise added thereto, and stirring was continued for 60 minutes. The reaction mixture was allowed to cool to give a catalyst product. The product was colored gray or lack due to the presence of unreacted metallic sodium.

EXAMPLE D

In a 100 ml. four-necked flask, alumina mainly consisting of γ type (water content, 6.0%) (50 g.) was charged and heated up to 200° C. under nitrogen while stirring. Fragments of metallic sodium (3.8 g.) were added thereto at the same temperature over 20 minutes, and the resultant mixture was stirred for 1 hour. Then, the temperature was gradually raised up to 400° C., and fragments of metallic sodium (1.9 g.) were added thereto over 10 minutes. Stirring was continued at the same temperature for 3.5 hours to give a catalyst product. The product was colored white, and the absence of metallic sodium was confirmed by the X-ray diffraction.

EXAMPLE E

In a 100 ml. four-necked flask, alumina mainly consisting of χ and γ types (water content, 1.6%) (50 g.) was charged and heated up to 400° C. under nitrogen while stirring. Fragments of metallic potassium (1.8 g.) were added thereto at the same temperature over 7 minutes, and the resultant mixture was stirred for 2 hours and allowed to cool to give a catalyst product. The product was colored greyish white, and the absence of metallic potassium was confirmed by the X-ray diffraction.

EXAMPLE F

In a 100 ml. four-necked flask, alumina mainly consisting of γ type (50 g.) was charged and heated up to 400° C. under nitrogen while stirring. Fragments of metallic sodium (1.9 g.) were added thereto at the same temperature over 5 minutes, and the resultant mixture was stirred for 2 hours and allowed to cool to give a catalyst product.

EXAMPLE G

In a 100 ml. four-necked flask, alumina mainly consisting of χ and γ types (water content, 2.0%) (50 g.) was charged and heated up to 400° C. under nitrogen while stirring. Fragments of metallic sodium (2.5 g.) were added thereto at the same temperature over 5 minutes, and the resultant mixture was stirred for 2 hours and allowed to cool to give a catalyst product. The product was colored black partly due to the presence of unreacted metallic sodium.

EXAMPLE H

In a 100 ml. four-necked flask, alumina mainly consisting of ρ type (water content, 8%) (50 g.) was charged and heated up to 300° C. under nitrogen while stirring. Metallic sodium (5.2 g.) was portionwise added thereto at the same temperature over 15 minutes, and the resultant mixture was stirred for 1 hour. Then, the temperature was gradually raised up to 400° C., and metallic sodium (1.8 g.) was added thereto over 5 minutes. Stirring was continued at the same temperature for 2 hours, and the reaction mixture was allowed to cool to give a catalyst product.

EXAMPLE 1

In a 25 ml. flask, 1,5-cyclooctadiene (8.56 g.) was charged, and the atmosphere was replaced by nitrogen. The catalyst (1.5 g.) obtained in Example A was added thereto, and the resultant mixture was stirred at room temperature (25° C.). The sample of the reaction mixture was periodically taken and analyzed gas chromatography. The reaction proceeded as shown in Table 1.

TABLE 1

| Time (min.) | 1,5-cyclo-octadiene, percent | 1,3-cyclo-octadiene, percent |
|---|---|---|
| 0 | 100 | |
| 30 | 32.1 | 67.9 |
| 80 | 0 | 100 |

After elimination of the catalyst by filtration, the filtrate was distilled to give 1,3-cyclooctadiene (8.43 g.). B.P., 74.0 to 74.5° C./82 mm. Hg. By the NMR and IR measurements, it was confirmed to be cis-cis isomer.

EXAMPLE 2

In a 25 ml. flask, 1,5-cyclooctadiene (8.55 g.) was charged, and the atmosphere was replaced by nitrogen. The catalyst (1.5 g.) obtained in Example A was added thereto, and the resultant mixture was stirred at 70° C. After 25 minutes, the gas chromatographic analysis of the reaction mixture revealed the absence of 1,5-cyclooctadiene and the presence of 1,3-cyclooctadiene (cis-cis isomer). Removal of the catalyst by filtration gave 1,3-cyclooctadiene (8.4 g.) of 100% purity.

EXAMPLE 3

In a 25 ml. flask, 1,5-cyclooctadiene (8.5 g.) was charged, and the atmosphere was replaced by nitrogen. The catalyst (1.3 g.) obtained in Example B was added thereto, and the resultant mixture was stirred at room temperature. After 70 minutes, the gas chromatographic analysis of the reaction mixture revealed the absence of 1,5-cyclooctadiene and the presence of 1,3-cyclooctadiene. After elimination of the catalyst by filtration, the reaction mixture was distilled to give 1,3-cyclooctadiene (8.2 g.). B.P., 34.0 to 34.5° C./35 mm. Hg.

EXAMPLE 4

In a 25 ml. flask, 1,5-cyclooctadiene (8.5 g.) was charged, and the atmosphere was replaced by nitrogen. The catalyst (1.5 g.) obtained in Example C was added thereto, and the resultant mixture was stirred at room temperature. After 1.5 hours, the catalyst was eliminated by filtration. The gas chromatographic analysis of the filtrate (8.2 g.) revealed the presence of 1,3-cyclooctadiene and 1,5-cyclooctadiene in a ratio of 98.2:1.8 by weight.

EXAMPLE 5

In a 35 ml. flask, 1.5-cyclooctadiene (8.6 g.) was charged, and the atmosphere was replaced by nitrogen. The catalyst (1.5 g.) obtained in Example D was added thereto, and the resultant mixture was stirred at 50° C. After 80 minutes, the 99.8% conversion of 1,5-cyclooctadiene to 1,3-cyclooctadiene was confirmed by the gas chromatographic analysis. The catalyst was eliminated by filtration, and the filtrate was distilled to give 1,3-cyclooctadiene (8.3 g.). B.P., 74.0 to 74.5° C./82 mm. Hg.

EXAMPLE 6

In a 25 ml. flask, 1,5-cyclooctadiene (5.0 g.) was charged, and the atmosphere was replaced by nitrogen. The catalyst (1.0 g.) obtained in Example E was added thereto, and the resultant mixture was stirred at room temperature. After 80 minutes, the 99% conversion of 1,5-cyclooctadiene to 1,3-cyclooctadiene was confirmed by the gas chromatographic analysis.

EXAMPLE 7

In a 25 ml. flask, 1,5-cyclooctadiene (5.0 g.) was charged, and the atmosphere was replaced by nitrogen. The catalyst (1.0 g.) obtained in Example F was added thereto, and the resultant mixture was stirred at room temperature. After 2 hours, the 98% conversion of 1,5-cyclooctadiene to 1,3-cyclooctadiene was confirmed by the gas chromatographic analysis. The catalyst was eliminated by filtration and the filtrate was distilled to give 1,3-cyclooctadiene (4.6 g.). B.P., 34.0 to 34.5° C./35 mm. Hg.

EXAMPLE 8

In a 300 ml. flask, 1,5-cyclooctadiene (150 g.) was charged, and the atmosphere was replaced by nitrogen. The catalyst (5.0 g.) obtained in Example G was added thereto, and the resultant mixture was stirred at 50° C. After 4 hours, the 96% conversion of 1,5-cyclooctadiene to 1,3-cyclooctadiene was confirmed by the gas chromatographic analysis.

EXAMPLE 9

In a 25 ml. flask, 1,5-cyclooctadiene (8.5 g.) was charged, and the atmosphere was replaced by nitrogen. The catalyst (1.2 g.) obtained in Example H was added thereto, and the resultant mixture was stirred at room temperature. The reaction mixture was analyzed by gas chromatography with the elapse of time. The results are shown in Table 2.

TABLE 2

| Time (min.) | 1,5-cyclo-octadiene, percent | 1,3-cyclo-octadiene, percent |
|---|---|---|
| 0 | 100 | |
| 20 | 46.9 | 53.0 |
| 40 | 28.1 | 71.7 |
| 60 | 17.3 | 82.5 |
| 80 | 6.6 | 93.1 |
| 100 | 3.0 | 96.7 |

What is claimed is:

1. A process for the production of 1,3-cyclooctadiene which comprises contacting 1,5-cyclooctadiene with a catalyst obtained by heating alumina, from 0.01 to 100% by weight of the alumina of an alkali metal hydroxide, and from 0.01 to 1 molar amount with respect to the alkali metal hydroxide of an alkali metal at a temperature higher than the melting point of the alkali metal, whereby the resulting catalyst composition does not contain the alkali metal as a simple substance and consequently does not ignite on exposure to air and does not generate hydrogen on admixture with water.

2. The process according to claim 1, wherein the catalyst is used in an amount of 1/100 to 100% by weight with respect to the starting 1,5-cyclooctadiene.

3. The process according to claim 1, wherein the catalyst is used in an amount of 1/100 to 1/5 % by weight with respect to the starting 1,5-cyclooctadiene.

4. The process according to claim 1, wherein the reaction is effected batchwise or continuously.

5. The process according to claim 1, wherein the reaction is effected in an inert gas.

6. The process according to claim 1, wherein the catalyst is obtained by heating said alumina, alkali metal hydroxide and alkali metal at a temperature of from 200° to 500° C.

7. A process for the production of 1,3-cyclooctadiene which comprises contacting 1,5-cyclooctadiene with 1/1000 to 100% by weight of a catalyst at a temperature from room temperature to the boiling point of 1,5-cyclooctadiene to give 1,3-cyclooctadiene in cis-cis form, the said catalyst beign obtained by heating alumina, from 0.01 to 100% by weight of the alumina of an alkali metal hydroxide, and from 0.01 to 1 molar amount with respect to the alkali metal hydroxide of an alkali metal at a temperature of from 200° to 500° C., whereby the resulting catalyst composition does not contain the alkali metal as a simple substance and consequently does not ignite on exposure to air and does not generate hydrogen on admixture with water.

8. The process according to claim 7, wherein the catalyst is used in an amount of 1/100 to 1/5 by weight with respect to the starting 1,5-cyclooctadiene.

9. The process according to claim 7, wherein the reaction is effected batchwise or continuously.

10. The process according to claim 7, wherein the reaction is effected in an inert gas.

11. A process for the production of 1,3-cyclooctadiene which comprises contacting 1,5-cyclooctadiene with 1/1000 to 100% by weight of a catalyst at a temperature from room temperature to the boiling point of 1,5-cyclooctadiene to give 1,3-cyclooctadiene in cis-cis form, the said catalyst being prepared by heating an alkali metal and alumina having water removable therefrom at a temperature from 200° to 500° C., whereby the resulting catalyst composition does not contain the alkali metal as a simple substance and consequently does not ignite on exposure to air and does not generate hydrogen on admixture with water.

12. A process for the production of 1,3-cyclooctadiene which comprises contacting 1,5-cyclooctadiene with a catalyst obtained by heating alumina having water removable therefrom in a content of 1.3 to 15% by weight and an alkali metal in an amount of 1.01 to 2 times the amount which can consume completely the water in the starting alumina at a temperature higher than the melting point of the alkali metal.

13. The process according to claim 12, wherein the catalyst composition is obtained by heating at a temperature from 200° to 500° C.

14. The process according to claim 13, wherein the catalyst is used in an amount of 1/1000 to 100% by weight with respect to the starting 1,5-cyclooctadiene and wherein the 1,5-cyclooctadiene is contacted with said catalyst at a temperature from room temperature to the boiling point of 1,5-cyclooctadiene to give 1,3-cyclooctadiene in cis-cis form.

References Cited
UNITED STATES PATENTS

| | | | |
|---|---|---|---|
| 3,437,698 | 4/1969 | O'Grady et al. | 260—615 |
| 3,213,155 | 10/1965 | Schriesheim | 260—683.2 |

DELBERT E. GANTZ, Primary Examiner

V. O'KEEFE, Assistant Examiner

U.S. Cl. X.R.

252—413, 476